(12) United States Patent
Champagne

(10) Patent No.: US 7,194,761 B1
(45) Date of Patent: Mar. 20, 2007

(54) METHODS AND APPARATUS PROVIDING AUTOMATIC CLIENT AUTHENTICATION

(75) Inventor: Jean-Philippe Champagne, Goleta, CA (US)

(73) Assignee: Cisco Technology, Inc., San Jose, CA (US)

( * ) Notice: Subject to any disclaimer, the term of this patent is extended or adjusted under 35 U.S.C. 154(b) by 912 days.

(21) Appl. No.: 10/054,027

(22) Filed: Jan. 22, 2002

(51) Int. Cl.
  *G06F 13/00* (2006.01)
  *G06F 15/16* (2006.01)
  *G06F 9/44* (2006.01)

(52) U.S. Cl. .............. 726/6; 726/12; 726/13; 726/14; 726/30; 709/232; 709/234; 709/238; 713/155; 713/160; 713/168; 713/170

(58) Field of Classification Search ............ None
See application file for complete search history.

(56) References Cited

U.S. PATENT DOCUMENTS

| | | | |
|---|---|---|---|
| 5,586,260 A * | 12/1996 | Hu ............................ | 726/12 |
| 6,219,669 B1 * | 4/2001 | Haff et al. ................. | 707/100 |
| 6,606,663 B1 * | 8/2003 | Liao et al. ................. | 709/229 |
| 6,976,085 B1 * | 12/2005 | Aviani et al. ............. | 709/234 |
| 7,000,024 B1 * | 2/2006 | Champagne et al. ....... | 709/232 |
| 2003/0177187 A1 * | 9/2003 | Levine et al. ............. | 709/205 |
| 2004/0049515 A1 * | 3/2004 | Haff et al. ................. | 707/100 |

OTHER PUBLICATIONS

Chen,Yih-Farn, et al, 'iMobile EE- An Enterprise Mobile service Platform', Wireless Networks 9, 2003, pp. 283-297, http://delivery.acm.org/10.1145/780000/778492/p283-chen.pdf?key1=77849&key2=2843142611&coll=GUIDE&dl=GUIDE&CFID=4976993&CFTOKEN=41615206.*

* cited by examiner

*Primary Examiner*—Nasser Moazzami
*Assistant Examiner*—Ronald Baum
(74) *Attorney, Agent, or Firm*—Chapin IP Law, LLC; Barry W. Chapin, Esq.

(57) ABSTRACT

Mechanisms and techniques provide a system that operates in a data communications device to provide automatic authentication of a client device to a server device. The mechanisms and techniques (i.e., the system) operate to detect a requirement for authentication of a request for data sent from a client device to a server device. In response, the system creates an authentication response in response to detecting the requirement for authentication. The authentication response contains authentication information required by the server device to allow the client device to access data via the server device. The system then automatically inserts the authentication response into the data communications session between the client device and the server device. The authentication response authenticates, to the server device, access to the data by the client device. The system also maintains the data communications session between the server device and the client device in the presence of authentication response information inserted into the data communications session between the client device and the server device.

34 Claims, 6 Drawing Sheets

METHODS AND APPARATUS PROVIDING AUTOMATIC CLIENT AUTHENTICATION

BACKGROUND OF THE INVENTION

Computer and information networks such as the Internet allow users of computer systems to exchange data using a variety of mechanisms and techniques. As an example, a user controlling a web browser software application operating on a client computer system coupled to a local area network (LAN) can select a hyperlink that corresponds to a data (e.g., a web page) stored on (or served by) a web server computer system coupled to a wide area network (WAN) such as the Internet. The two networks (i.e., the LAN and the WAN) may be coupled by one or more data communications devices such as edge routers or switches that may operate as gateways or firewalls between the two networks. In response to the user's selection of the hyperlink, the web browser uses one or more protocols such as a HyperText Transport Protocol (HTTP) over the Transmission Control Protocol (TCP) to communicate through the network with a web server software application operating on the web server computer system in order to establish a data communications session between the client computer system and the web server. Once such a session is established, the web server can begin serving or otherwise providing the requested data (e.g., web page or other information) in one or more data packets back to the browser operating on the client computer system. Upon receipt of the data, the browser can render, play or otherwise present the requested data to the user. In this manner, a web site operating as a collection of one or more web servers can serve data serving data to client)

In some situations, an organization operating a web server computer system may desire to restrict access to data that can be served by the web site to one or more users. As an example, a web site operator may require user authentication in order for the user to be able to access certain documents or other data served by the web site. Data communications protocols such as HTTP provide user authentication features that may be enabled in order to protect or restrict access to such documents. As an example, HTTP has authentication features that enable authentication of users either by the hostname of the browser being used or by asking for a username and password from a specific user attempting access to restricted data.

Generally, to enable HTTP user authentication, an administrator or Webmaster of a web site creates a user database of usernames and corresponding passwords. In addition, the administrator configures a realm which designates a section of the web site such as a directory and all of its subdirectories that contain data that requires user authentication for access to the data. Using various other conventional techniques, the administrator can then associate usernames (some or all) or hostnames or hostname/username pairs to the realm (or to certain portions or resources within the realm) in order to specify which users or which hosts (i.e., which client computers) are allowed access to which resources (i.e., to which documents) in the realm provided that those users supply a correct password for such access.

Once properly configured, a conventional web site using the aforementioned user authentication techniques can operate to receive client requests for access (e.g., a user request to access a web page) to a resources within the realm that require authentication. Since a requested resource requires authentication, the server computer system will return an "Unauthorized" status (e.g., in HTTP 401 status) back to the client browser in response to such a request. The unauthorized status will include an authentication response header that identifies the authentication scheme in use (i.e., required) by the server, such as basic authentication requiring a username and password from the user operating the client browser. The browser will then ask the user to enter a username and password and upon entry of such information, the browser will again request access to the resource but this time will include an authentication header within the second request. The authentication header contains the name of the authentication scheme as well as the username and password information entered by the user. Upon receipt of the request containing the authentication header by the server, the server checks the username and password against its authentication database and if they are valid, returns the requested data (e.g., the web page).

Assuming that the username and password are valid, the user might operate the Web browser to provide another request a resource (e.g., another web page) that is protected within the realm (i.e., that requires user authentication). To avoid having to require the user to enter username and password details again for the same realm, conventional browsers are configured to send the authentication header on each subsequent request to the same web server. In this manner, once a user is authenticated for access to the realm for a web server, the user can access other resources of the realm without the requirement of username and password entry.

SUMMARY OF THE INVENTION

Conventional techniques that provide for user authentication to resources over a computer network suffer from a variety of deficiencies. As an example, conventional techniques for user authentication require that the user be involved with the authentication process. That is, conventional techniques prompt the user for a valid username and password pair in order to allow access by the user to a restricted resource.

As another example, in situations where different users might require access to the same set of restricted resources (i.e., resources that require authentication), each user must take the time to provide a valid username and password in order to gain access to such resources. This requires that each user be aware of a valid username and password pair. In such cases, either each user must either maintain their own individual username and password pair or, the organization of users as a whole, such as a company which employs the users, must provide each user with a single valid username and password pair that all users can use for access to a resource requiring user authentication. Each of these arrangements suffer in various ways of their own.

In particular, it is quite common for users to lose track of their individual valid username and password pairs such as, for example, by forgetting a password selected by the user for access to a particular resource that requires authentication. In situations in which an organization such as a company provides a single valid username and password pair to all users (i.e., all users share the same username and password for access to the resource), issues can arise with respect to abuse of access to the resource. For instance, a user may share the valid username and password pair with others outside of the organization, or a user may leave the organization in which case the organization might need to change the valid username and password pair and inform all users still associated with the organization of the new valid username and password required to access the restricted resource. Generally then, management of username and password accounts with an organization can be a substantial and costly issue, especially in cases where the organization must pay for units of time during which access is granted resources requiring user authentication.

Embodiments of the present invention significantly overcome such deficiencies and provide mechanisms and techniques for automatic authentication of users requesting access to a resource such as web server data requiring user (or host) authentication. In particular, embodiments of the invention are implemented within one or more data communications devices operating in a network that exists between client devices (e.g., a client computer system operating client Web browser software) and server devices (e.g., a server computer system operating web server software). Such embodiments can monitor a data communications session between a client device and a server device in order to detect requests for data from client devices that require authentication of the client device to the server device prior to the server device granting access to the requested data.

As an example, upon detecting an initial request for data sent from a client device to a server device, embodiments of the invention can cache or temporarily store the request for data and forward the initial request on to the server device. If the request is a request to access restricted data (e.g., data in a protected realm of the server), thus requiring authentication of the client device by the server device, the server device will return an authentication request (e.g., an HTTP 404 status request indicating that access requires username/password authentication) back towards the client device. Embodiments of the invention are able to intercept this returned authentication request, and using the previously stored (e.g., cached) client request for data, can access proper authorization information on behalf of the client device (but without requiring client device assistance) which is capable of authenticating the client device to the server device. Embodiments of the invention create an authentication response that includes a copy of the original request for data (i.e., from the cache) along with the authorization information required to authenticate access to the requested data by the server device. Once created, the embodiments of the invention can insert the authentication response into the data communications session for return from the data communications device equipped with the invention to the server device to allow the server device to authenticate the client request for data and provide access to the restricted data. This may be done unbeknownst to the client device that only sent the initial request for data towards the server device. Upon receipt of the authentication response containing the original request and the authentication information, the server device can authenticate the request and can grant access to the requested data, thus returning the data back toward the client device over the data communications session.

Embodiments of the invention can be implemented within data communications devices such as routers, switches or other such devices, or within data communications devices such as web caching devices that terminate TCP connections themselves and that receive separate connections from client devices (e.g., browsers) for cached pages. In implementations involving web caches that terminate TCP sessions, the web cache is the initiator of the TCP session to the server device and thus does not need to utilize data insertion technology to supply the username and password in the request. Instead, the web cache can include authentication information in requests for web pages which are returned to the cache, without the need to modify connection information in mid-stream. Also in such embodiments, a secure protocol, such as HTTPS (HTTP over SSL) can also be used.

Embodiments of the invention can utilize data insertion technology disclosed in a co-pending U.S. application for patent entitled "METHODS AND APPARATUS FOR INSERTING DATA INTO A COMMUNICATIONS SESSION," having U.S. Ser. No. 10/044,216, filed Nov. 20, 2001, now U.S. Pat. No. 6,976,085, which is assigned to the same Assignee as the present invention and which shares co-inventorship with the present invention for this purpose. The entire teachings and contents of this reference to U.S. patent application (U.S. Ser. No. 10/044,216, now U.S. Pat. No. 6,976,085) are hereby incorporated by reference herein. Essentially, the technology disclosed in the aforementioned co-pending patent application allows embodiments of the present invention to insert data into the data communications session between a client and server device without disrupting expected connection states maintained by each of the client and server devices, thereby not disrupting the data communications sessions due to the insertion or presence of the additional data such as the re-created initial request containing the authentication data.

In addition, embodiments of the invention can detect subsequent client requests for data from client devices that have already been authorized or authenticated to the server device (as briefly explained above). In such cases, embodiments of the invention are able to intercept such unauthenticated client requests for data and are able to insert the necessary authorization or authentication information into these client requests for data and are able to forward these client requests for data, which now contain the required additional authentication information to the server device. Again, the addition of the authentication information into the client requests can be done without the client device being aware of such processing and without the user of the client device being required to enter any authentication information such as a username and password at any time.

Once an embodiment of the invention operates to insert information into the data communications session (i.e., information such as the re-created client requests containing authentication information) that did not originate from either the client or the server devices, such an embodiment can utilize the aforementioned patent pending data insertion technology to maintain the remainder of the data communications session (i.e., between a client and a server) for all messages sent between the client server devices so that the insertion of data does not disrupt the connection state maintained by the client and server devices. In other words, any authorization or authentication information inserted into messages exchanged between the client and server devices, or any re-created requests for data containing such authentication information which are inserted into the data communications session can be compensated for by adjusting connection information such as TCP sequence and acknowledgement information within packets traveling on the data communications session between the devices (in either direction) so as to not disrupt the data communications session state information as maintained within the client and server devices.

Embodiments of the invention thus allow an organization to maintain a small set of accounts (possibly only one) in a centralized manner no matter how many users operating clients in the organization require access to restricted data. Since authentication is done without the requirement for client interaction, users and clients need not be aware that authentication is required for access to restricted data. In addition, since authentication is maintained out of the control of the users, there is little or no chance that a user can compromise valid authentication information by using such information outside of the organization (e.g., from home) or by passing such information (e.g., a valid username and password) onto someone else outside of the organization. As will be explained, other embodiment can provide different levels of authenticated access to restricted data by selecting different authentication information depending, for example, on which client device is requesting such data (e.g., based on which subnet of a company network the request for data originates), or based on the type of data requested, or other authorization or authentication criteria.

More specifically, embodiments of the invention provide methods and apparatus that provide authentication of a client device to a server device. One such method embodiment comprises the step of detecting a requirement for authentication of a request for data sent from a client device to a server device. The method then creates an authentication response in response to the step of detecting the requirement for authentication. The authentication response contains authentication information required by the server device to allow the client device to access data via the server device. The method inserts the authentication response into the data communications session between the client device and the server device. The authentication response authenticates, to the server device, access to the data by the client device. The method also maintains the data communications session between the server device and the client device in the presence of authentication response information inserted into the data communications session between the client device and the server device, thereby avoiding disruption of the data communications session.

In another embodiment of the invention, the step of detecting a requirement for authentication of a request for data sent from a client device to a server device comprises detecting, in a data communications session between a client device and a server device, an authentication request sent from the server device to the client device for authentication of the client device by the server device. In another embodiment, the step of detecting an authentication request comprises the step of intercepting an unauthorized response sent from the server device to the client device over the data communications session. The unauthorized response indicates that the server device requires authentication of the client device in order for the client device to access the data using the server device. In still another embodiment, the unauthorized response from the server device is generated by the server device in response to an unauthenticated request for data sent from the client device to the server device over the data communications session.

In another embodiment of the invention, the step of detecting a requirement for authentication of a request for data sent from a client device to a server device comprises the steps of detecting, in a data communications session between a client device and a server device, a request for data sent from a client device to a server device for access to data using the server device and then caching the request for data in the data communications device. Caching of requests can be done, for example, for requests being placed or sent to servers for which the data communications device of this invention already has a pre-configured set of authentication information (e.g., a valid username and password) available for use should the server return an authentication request. The method then forwards the request for data to the server device. The method also detects, in the data communications session between a client device and a server device, an authentication request sent from the server device to the client device for authentication of the request for data sent from the client device to the server device. In this manner, by caching a request for data from a client, it can used to re-request the same data in the event that the server device rejects the request and sends an authentication request back to the client indicating that valid authentication information must be received before the client is allowed access to the requested data. The data communications device of this invention can intercept this return authentication request, and can obtain the authentication information (e.g., from a single user account no matter which client is asking), and can use the cached request to re-request the same data along with the required authentication information.

In another embodiment, the step of creating an authentication response comprises the steps of obtaining authentication information associated with the client device. The authentication information is capable of authorizing, on behalf of the client device, access to the data using the server device. The method incorporates the authentication information into the authentication response such that the authentication response, when received by the server device due to the step of inserting, allows the server device to authenticate access, by the client device, to data using the server device.

In another embodiment, the authentication information is access control information and the step of incorporating comprises the steps of placing the access control information into an authentication header of a packet of data serving as the authentication response to allow the client device to access restricted data using the server device and adjusting connection information associated with the packet of data to account for the authentication information incorporated into the authentication response. As an example, TCP sequence and acknowledgement information in the packet header can be adjusted to compensate for the extra data inserted. This embodiment also formats the authentication response to appear as though it originated from the client device such that the server device is unaware that the client device did not actually provide the authentication information.

In another embodiment, the authentication response is a packet including an authentication header containing the authentication information and is created by the data communications device to appear as though it originated from the client device. Furthermore, the step of inserting the authentication response into the data communications session between the client device and the server device comprises the step of forwarding the authentication response to the server device over the data communication session as at least one packet of extra data. The authentication response being formatted to appear as though it originated from the client device.

In a further embodiment, the steps of detecting, creating, inserting and maintaining are performed by the data communications device without assistance from the client device and/or the server device and are performed such that the data communications session between the client device and the server device is free from disruption due to authentication requirements of the client device to the server device.

In another embodiment, the step of maintaining the data communications session between the server device and the client device after inserting the authentication response into the data communications session comprises the steps of maintaining connection state data in the data communications device that tracks an amount of extra data associated with the authentication response that is inserted into the data communications session between the client device and the server device. This embodiment also modifies connection information within packets passing through the data communications device that are exchanged between the client device and server device using the data communications session in order to allow the client and server device to maintain proper respective first and second connection states for the data communications session regardless of the amount of extra data added in the data communications session due to insertion of the authentication response.

In another embodiment, the steps of detecting, creating, inserting and maintaining are repeated for at least a first and second iteration and for the first iteration, the step of detecting a requirement for authentication of a request for data comprises the step of detecting an authentication request sent over the data communications session from the server device to the client device in response to the client device providing a first request for access to data using the server device. Also, for the first iteration, the step of creating an authentication response comprises the steps of recreating the first request for access to first data and placing authentication information into the recreated first request to allow the server device to authenticate the recreated first request upon being received by the server device in the step of inserting.

In yet another embodiment, for the second iteration of the steps of detecting, creating, inserting and maintaining, the step of detecting a requirement for authentication of a request for data comprises the step of detecting a second request for access to data sent from the client device to the server device and the step of creating an authentication response in the second iteration comprises the steps of intercepting the second request for access to data and generating an authentication response by inserting the authentication information as an authentication header into the second request to allow the server device to authenticate the second request for data on behalf of the client device without requiring generation of an authentication request (i.e., had the request for data not been intercepted). Also, for the second iteration, the step of inserting the authentication response into the data communications session between the client device and the server device comprises the step of forwarding the second request containing the authentication header to the server device such that the server device can authenticate the second request.

In still another embodiment, the step of detecting a requirement for authentication of a request for data sent from a client device to a server device comprises at least one of the steps of a) detecting an authentication request being transmitted from a server device through the data communications device to a client device in response to the client device providing a first request for data to the server device that requires authentication by the server device and/or b) detecting a second request for data being transmitted through the data communications device from the client device to the server device and detecting that the client device provided a first request for data to the same server device.

In an additional embodiment, the data communications session is a transmission control protocol session between the client device and the server device and the step of maintaining modifies connection information within messages exchanged between the client device and the service device to account for the insertion of authentication information inserted into the data communications session in order to provide automatic authentication of requests for data sent to the server device on behalf of client devices.

In still another embodiment, the steps of detecting, creating, inserting and maintaining are performed on behalf of a plurality of client devices and wherein the authentication information is selected in the step of creating from different sets of authentication information (i.e., authentication or authorization criteria) based on at least one of an address of the client device, an address of the server device, a type of data specified in the request, and a protocol used to provide the request.

In another embodiment, the data communications device is a device operating in a network to which hypertext transport protocol traffic is redirected to perform the steps of detecting, creating, inserting and maintaining. This embodiment thus provides authentication to HTTP sessions in a manner that is automatic and transparent to clients and servers.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with an authentication manager application that when performed on the processor, produces an authentication manager process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with an authentication manager that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Figure 1:
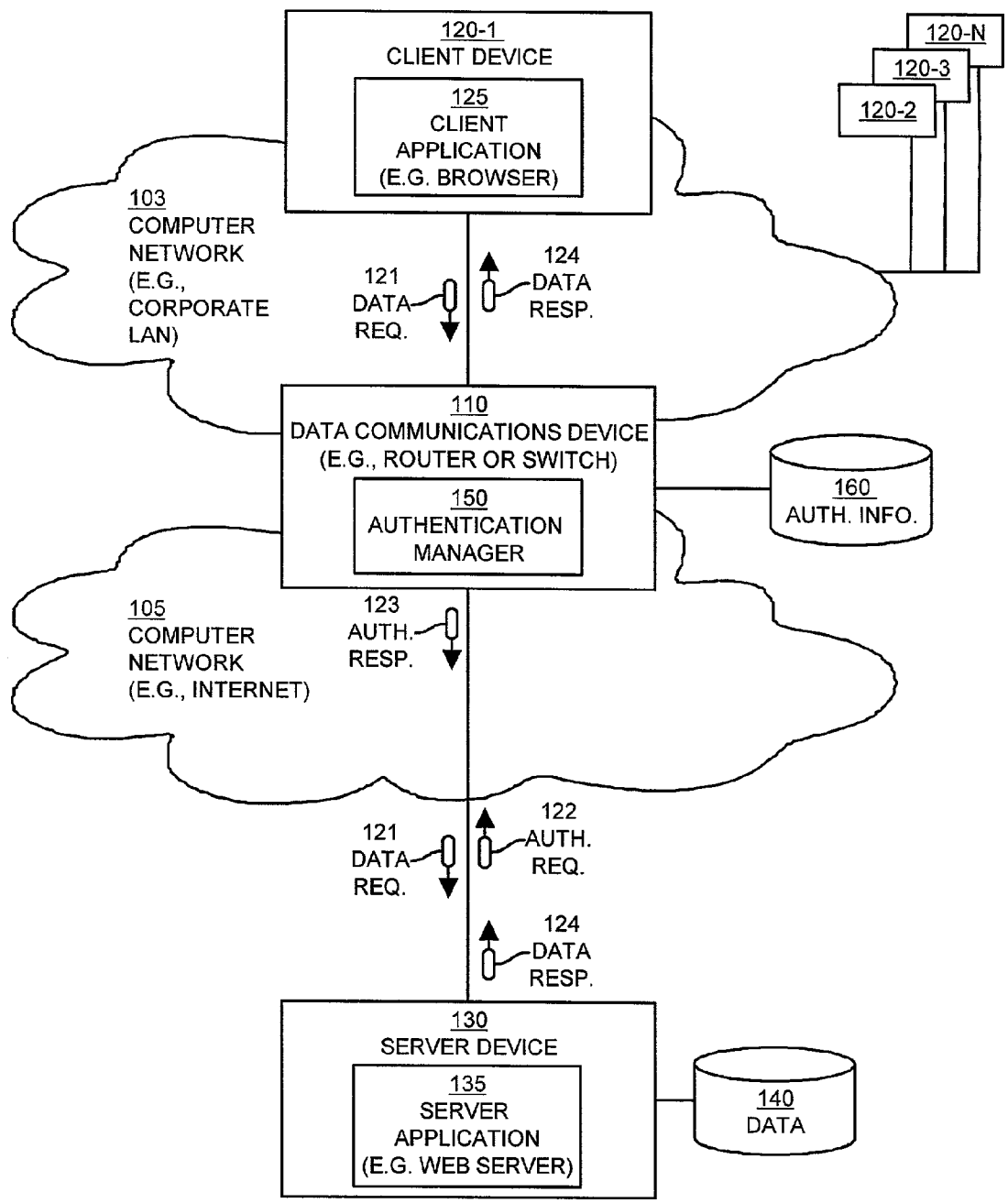
FIG. 1 illustrates an example of a computer network environment including a data communications device operating an authentication manager configured according to embodiments of the invention.

Embodiments of the present invention provide mechanisms and techniques for automatic authentication of users and/or hosts (i.e., client computer systems or devices) requesting access, over a network, to data or another resource via a server that requires user or user-host authentication prior to providing such access. In particular, embodiments of the invention are implemented within data communications devices such as an edge switch or router operating within a network that transfers network traffic (e.g., packets) traveling between client devices (e.g., a client computer system operating client Web browser software) and server devices (e.g., a server computer system operating web server software). An example of such a data communications device is an edge router or switch that couples a local area network (LAN) to a wide area network such as the Internet. A high level description of the general operation of embodiments of the invention will be provided next, followed by a more detailed explanation thereafter with reference to the attached figures.

Generally, in operation of a data communications device equipped with an embodiment of the invention, the data communications device can monitor one or more data communications sessions (e.g., TCP/IP connections) between client devices (e.g., clients operating in the LAN) and server devices (e.g., servers on the Internet) and can detect a requirement for authentication of a request for data sent from a client device to a server device. As an example, one embodiment of the invention is capable of detecting and intercepting a returned HTTP 401 status message that includes a WWW-authentication response header transmitted (i.e., returned) in an HTTP communications session from a server device to a client device. Such an authentication request message may be sent from the server to the client due to the client device requesting access to a restricted resource or data within the server device that requires authentication or authentication before access may be granted. As another example, an embodiment of the invention operating within a data communications device can detect subsequent requests for data sent from a client device to a server device over a data communications session in which authentication for the client device has already been provided to the server device in response to a former request for data to the same server device from the same or from a different client device operating in the same LAN serviced by the data communications device equipped with the invention.

In response to detecting such an authentication request for authentication of the client device by the server device (or in response to detecting subsequent requests for data to a server device that has already received authentication information), the data communications device can create (i.e., can generate or formulate) an authentication response that contains authentication information required by the server device to allow the client device to access the requested data via the server device. The client device does not need to take part in or even be aware of the creation of the authentication response and the user of the client does not need to supply a username or password. As an example, the data communications device can create an authentication response, on behalf of the client device, which includes access control information such as a valid username and password pair obtained from an authentication database configured within (or accessible from) the data communication device. The data communications device can then insert the authentication response into the data communications session for transmission back to the server device in order to authenticate, to the server device, access to the data by the client device. The authentication response can appear to the server device as if it had originated from the client device. The authentication response can be, for example, the original rejected request for data (originally sent from the client device to the server device, which was cached, as will be explained, by the data communications device) but which now contains an authentication header containing valid authentication information to allow the server device to authenticate the client device.

A data communications device configured with one embodiment of the invention can temporarily cache or store a copy of requests for data sent from a client device to a server device in the event that the server device returns an authentication request back towards the client device in cases where such a request for data is a request for restricted data that requires proper authentication before access is allowed. In one implementation, a data communications device can cache "outbound" requests for data from clients that are sent to server for which the data communications device already has preconfigured authentication information. In other words, a data communications device using the invention can examine the "Hosts:" field in a HTTP get request, or a destination IP address in the request packet, to determine the identity of the server to which the request is directed. Then, if the data communications device has access to authentication information associated with this server (i.e., the data communications device is pre-configured or has access to valid username/password information or other authentication information), then the data communications device can cache the outbound requests. In this manner, embodiments provide a mechanism such as an authentication table of other database of authentication information that identifies to which server(s) a valid set of authentication information (e.g., a username/password pair) belongs. As an example, authentication information can be associated with a domain name (e.g., ww.wsj.com), or an IP address of one or more servers or web sites. Having an association between authentication information and servers avoids embodiments of the invention having to cache requests for data for which there is no valid authentication available for the data communications device to provide and insert an authentication response. By maintaining such as association, embodiments of the invention will not interfere with requests for data (and authentication responses sent in return to the client) for which the data communications device does not have valid authentication information.

In this manner, when a data communications device using the invention receives an authentication request from a server device on route back to the originally requesting client device (and for which authentication information exists, due to the association noted above, or for which request(s) were cached), the data communications device configured according to embodiments of the invention can intercept this authentication request and can obtain the original cached request for data (the request that triggered the server device to send the authentication request). In response, the data communications device using the invention can insert authentication information (e.g., as an HTTP www-authentication header) into this cached request for data in order to formulate or create a new authentication response. The data communications device using the invention can then forward the newly created authentication response (i.e., the cached copy of the original request along with the required authentication information) to the server device as if it had originated from the client device. The client may be unaware that this is taking place or that authentication is even required for the requested data.

Once the server device authenticates the client device due to receipt of the proper authentication response (created and sent by an embodiment of the invention operating in a data communications device through which the data communications session passes), the server device can serve the requested data back to the client device over the data communications session back through the data communications device. As the returned data passes back through the data communications device using the invention, the data communications device can maintain the data communications session between a server device and the client device by adjusting connection information in the return packets so as to not disrupt the connection states maintained in the client and server devices. In other words, after inserting the authentication response into the data communications session, embodiments of the invention are able to track and properly alter connection information, such as TCP sequence and acknowledgement header values in packet headers, for any remaining communications between the client and server devices, in order to account for any extra data inserted into the data communications session between the client and the server. As an example, the data communications device can adjust connection information associated with messages (e.g., packets) sent between the client device and the server device (in either direction) to compensate for the newly created authentication responses containing authentication information inserted into requests for data provided to the server device on behalf of the client device (but not actually from the client device).

A data communications device configured according to certain embodiments of the invention thus includes the ability to insert data into an existing data communications session between the client and server devices without disrupting the data communications session. One technique for allowing such an insertion of data (e.g., authentication or authentication information) into a data communications session without disrupting the session (i.e., without disturbing or altering expected or maintained connection state information associated with the data communications session in either the client and/or the server devices) is described in the aforementioned referenced co-pending patent application.

Generally, using the technologies disclosed in that referenced patent application, the insertion of the authentication response into the data communications session causes additional or extra data to be transferred over the data communications session existing between the client and server devices, other than data originating from either the client or server devices themselves. Accordingly, the data communications device operating according to the invention can return (to the server device) authentication responses created on the fly to allow access to the restricted data or resources requested on behalf of clients without requiring the clients to provide such authentication information. Thereafter, during the lifetime or remainder of the data communications session between the client and server devices, the data communications device equipped with an embodiment of the invention utilizes the technology from the aforementioned reference patent application in order to maintain connection state data between the client and server device which is used to adjust connection information in messages exchanges between these devices to compensate for an extra inserted data (e.g., packets).

Generally, this entails tracking the amount of extra data (e.g., data associated with authentication response(s) and added as authentication information into subsequent client request for data once a client device has been authenticated to a server) that is inserted into the data communications session between the client device and the server device. The data communications device can modify connection information for subsequent messages (e.g., packets) that travel through the data communications device between the client server devices on that data communications session in order to allow the client and server device to perceive and maintain proper respective connection states for that data communications session, regardless of the amount of extra data added into the data communications session due to the insertion of authentication response(s) or other information.

As explained above with respect to typical operation of the authentication, for example, within an HTTP session, once a conventional client device supplies a valid username and password and is authenticated to a server device, a browser can automatically include, within subsequent requests for data from that client device to that server device, the required authentication information without requiring a user to re-enter a valid username and password for each request for restricted data. Accordingly, since embodiments of the invention provide for a data communications device that operates to automatically provide authentication information for an initial client request for restricted data (e.g., in response to server device rejecting the initial request, and providing an authentication request sent back towards the client device, which is intercepted by the data communications device as explained herein), the data communications device configured according to embodiments of the invention can also intercept subsequent requests for data from to the same server device (e.g., a second request for data from the same or a different client) and can automatically insert the necessary authentication information into such subsequent requests for data to avoid the server rejecting such requests. That is, the subsequent requests for data, which now contain the required authentication information, are then forwarded to the server device to avoid the server device having to return another authentication request back towards the client device.

In embodiments implemented within a web cache, clients such as browsers can use a separate connection, such as a TCP connection, to obtain data such as cached web pages form the web cache. If the cache does not have the pages, then embodiments of the invention operating in the web cache device (i.e., a data communications device operating as a web cache) can request the data (e.g., a page not in the cache) from the server device. If the server returns an authentication request, the data communications device operating the web cache, which terminates this connection (between the server device and the data communications device operating the web cache), can detect a requirement for authentication of the request for data sent from a client device to a server device by detecting the authentication request from the server. The device can create an authentication response in response to the detecting the requirement for authentication. The authentication response contains authentication information required by the server device to allow the client device to access data via the server device. The data communications device operating the web cache can then insert the authentication response into the data communications session between the data communications device and the server device. The authentication response authenticates, to the server device, the request for access to the data on behalf of the client device (from the web cache). In this manner, multiple clients can access data in the cache and the cache can obtain the data from a server using authentication information, for example, for just one user account. There is no need to utilize the data insertion techniques of the aforementioned patent when the data communications device utilizing embodiments of the invention terminates the connection to and from the server.

Further details of embodiments of the invention will now be explained with respect to the attached Figures which are discussed in detail below.

FIG. 1 illustrates a computer network environment 100 suitable for use in explaining example embodiments of the invention. As illustrated, a computer network 103 such as a local area network (e.g., a corporate LAN) couples a number of client devices 120-1 through 120-N to a data communications device 110. Another computer network 105, which may be a wide area network (WAN) such as the Internet, couples the same data communications device 110 to one or more server devices 130 (only one shown in this example). The computer networks 103 and 105 represent any type of networking medium (e.g., physical and/or wireless network links) that allows the transport of data between computerized devices. The data communications device 110 may be any type of computerized device capable of transporting data in any format through a computer network. Examples of the data communications device 110 include a router, switch, gateway, hub, bridge, proxy device, or the like. The data communications device 110 operates an authentication manager 150 configured according to embodiments of the invention. The authentication manager 150 can access authentication information 160 (e.g., a database of one of more valid user accounts) as will be explained shortly.

The client devices 120 represent any type of computerized device or computer system operating within the computer network 103 that require access to the data 140 maintained, served or otherwise accessed via the server device 130. Examples of client devices 120 are personal computers or workstations under the operation or control of individual users (not shown), though the client devices 120 may independently operate without user interaction. The example client device 120-1 operates a client application 133, which is a web browser in this example. The server device 130 represents any type of computerized device that operates as a server to serve data 140 or provide access to another resource (e.g., network attached storage) on behalf of client devices 120 that requests access to the data 140 (or another resource) under control of the server device 130. To provide such functionality, the server device 130 in this example operates a server application 135, which is a web server in this example, to serve the data 140 (e.g., web pages or other information) to client applications 125 that request access to such data 140.

The example operation illustrated in FIG. 1 shows a sequence of messages 121 through 124 that are exchanged between the various devices 110, 120 and 130 according to the operation of embodiments of the invention. Generally, and as will be explained in more detail, the authentication manager 150 operating within the data communications device 110 monitors data communications sessions between client devices 120 and server devices 130 (i.e., messages exchanged between the clients and servers) and is capable of authenticating, to the server device 130 (i.e., to the server application 135), requests for access to the data 140 made by client devices 120 in the event that access to the data 140 (or to another resource) requires authorization or authentication. Specific details of the exchange of messages and processing that take place according to embodiments of the invention will now be described with respect to the processing steps illustrated in FIG. 2, which generally represent the operation of the authentication manager 150 operating within the data communications device 110 according to one example embodiment of the invention.

The description of this example embodiment of the invention will be described with respect to a data communications session between the client device 120-1 and the server device 130. It is to be understood that embodiments of the invention can also apply to data communications sessions that take place between one or more or all of the client devices 120 and one or more server devices 130, so long as such data communications sessions pass-through or are handled by a data communications device 110 configured with an authentication manager 150 operating as explained herein.

Figure 2:
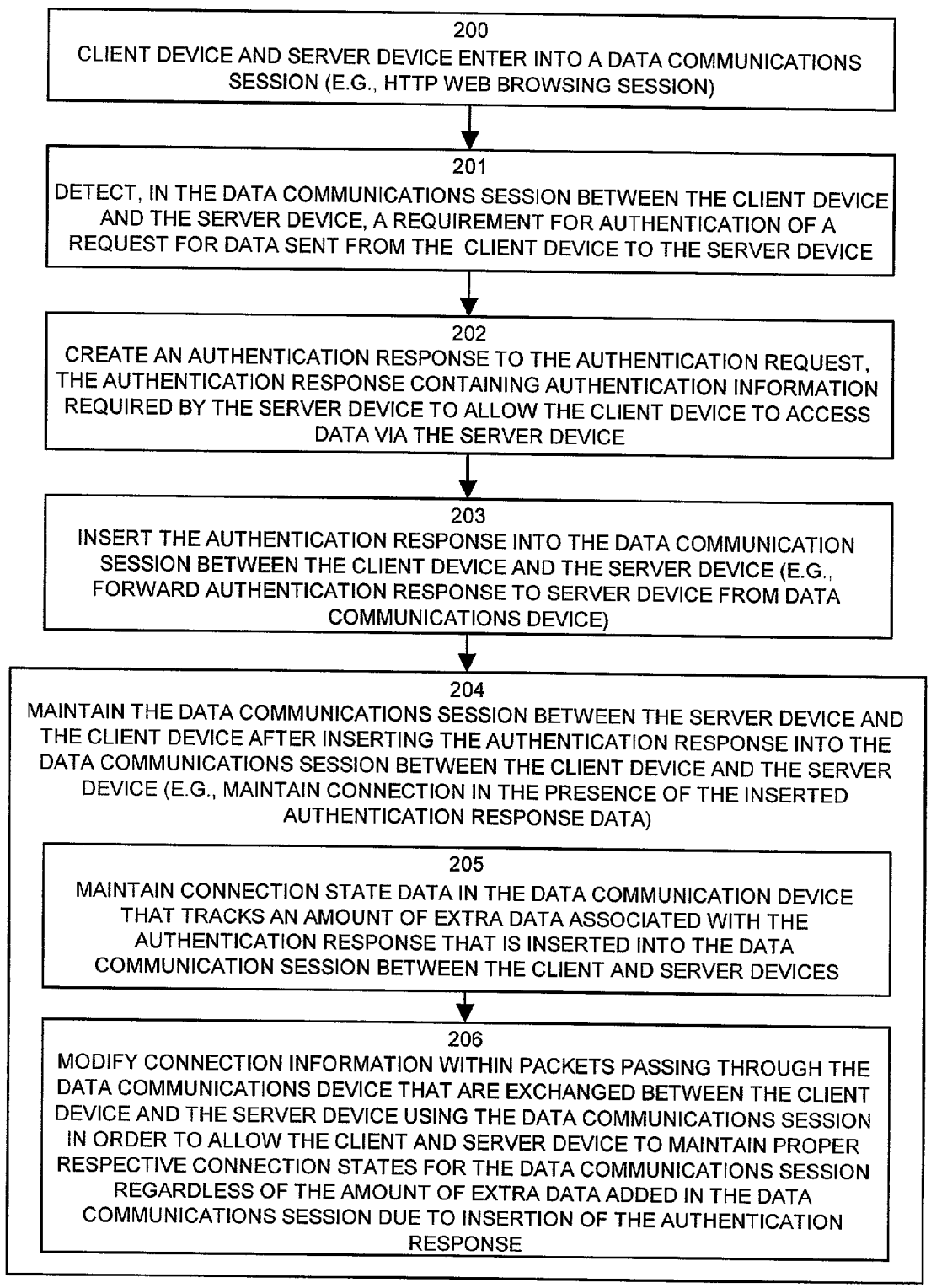
FIG. 2 is a flow chart that illustrates an example of processing steps performed by an authentication manager operating within a data communications device configured according to one embodiment of the invention.

FIG. 2 illustrates a flow chart of processing steps or operations performed by an authentication manager 150 operating within the data communications device 110 configured according to one embodiment of the invention.

In step 200, the client device 120-1 and the server device 130 enter into a data communications session such as an HTTP web browsing session. For this example discussion, the operation of forming a data communications session in step 200 might entail a user of the client device 120-1 operating the client application 133 (e.g., the web browser) to request pages of data (e.g., web pages) or other documents, data or information served by the server application 135 (e.g., a web server) operating within the server device 130. In doing so, the client application 133 begins the establishment of a TCP/IP communications session as well as an HTTP session with the server application 135 operating in the server device. The exchange of message in this manner between the client device 120-1 and the server device 130 thus takes place over a data communications session, such as the aforementioned TCP/IP session. As will be explained, the authentication manager 150 operating within the data communications device 110 is able to monitor the messages exchanged between the client device 121 and the server device 130 over the data communications session (and/or for an HTTP session).

In the example in FIG. 1, a request for data 121 originating from the client device 120-1 travels through the computer network 103 and reaches the data communications device 110 coupled to the computer network 105 for receipt by the server device 130 is illustrated in FIG. 1. Assume for this example discussion that the request for data 121 indicates that the client application 133 desires to access the data 140, but that the server application 135 requires authorization or authentication in order to grant such access. As an example, the data 140 can be associated with an HTTP realm that the server application 135 maintains with restricted access privileges and requires a valid username and password from a user (or requires a specific client device 120-N) operating the client application 133 in order to access the restricted data 140. As a result of receiving such a data access request 121, the server application 135 responds with an authentication request 122. The authentication request 122 indicates that the data 140 requested by the request for data 121 requires, from the client device 120-1 requesting access to such data, a valid username and password before such access is granted. The server application 135 forwards the authentication request 122 onto the computer network 105 for routing back to the client application 133 operating within the client device 120-1.

In step 201, the authentication manager 150 detects, in the data communications session now existing between the client device and the server device 130, a requirement for authentication of a request for data 121 sent from the client device 121 to the server device 130. In the example illustrated in FIG. 1, the authentication manager 150 can monitor the messages that travel between the client device 120-1 and the server device 130 over the data communications session and can detect the authentication request 122 traveling from the server device 130 back towards the client device 120-1. In other words, the authentication manager 150 is able to snoop or otherwise watch traffic on the data communications session between the client and server devices and is able to detect and intercept the authentication request 122.

In step 202, once the authentication manager 150 has detected the requirement for authentication of the request for data 121 (e.g., in this example embodiment, the authentication manager 150 detects the authentication request 122), the authentication manager 150 creates an authentication response 123 to the authentication request 122. The authentication response 123 contains authentication information 160 required by the server device 130 (i.e., by the server application 135) to allow the client device 120-1 (i.e., the client application 133) to access the restricted data 140 via the server device 130. In other words, in step 202, the authentication manager 150 fabricates an authentication response 123 for transmission to the server device 130. The authentication response 123 contains any necessary authentication information 160 such as a valid username and password pair that can authenticate to the server application 135 that a valid user is operating the client application 133. It is to be understood that the authentication information may be any information that the server device 130 requires to grant the requested access, and does not have to identify or be associated with the particular client device or user that is actually making the request. In other words, a single valid username and password pair may be acceptable as authentication information 160 for all client devices 120-1 through 120-N that request access to the same server 130.

The authentication response 123 in this example embodiment of the invention is created in step 202 to appear as though it originates from the client device 120-1. This is done, for example, by having the authentication manager 150 monitor connection information (e.g., IP addresses and TCP port numbers) related to the data communications session existing between the client device 120-1 and the server device 130. Such connection information can include, for example, network addresses of the client server devices, data communications session protocol information (e.g., TCP/IP information) such as port numbers, sequence and acknowledgment numbers and/or other information that the authentication manager 150 may require in order to create a packet of data that can be inserted into the data communications session between the client device 120-1 and the server device 130, for return to the server device 130 to appear as though it originated from the client device 120-1. Again however, it is to be understood that the packet appears as though it originated from the client device 120-1 (e.g., from a packet header perspective), but the authentication information 160 such as a username and password needs not to be associated with this specific client 120-1, as long it is acceptable for authentication purposes to the server device 130.

Next, in step 203, the authentication manager 150 controls the data communications device 110 to insert the authentication response 123 into the data communications session between the client device 120-1 and the server device 130. As an example, the authentication manager 150 forwards the authentication response 123 to the server device 130 from the data communications device 110 using the aforementioned technology from the above-referenced co-pending patent application entitled "METHODS AND APPARATUS FOR INSERTING DATA INTO A COMMUNICATIONS SESSION". Using this technology for inserting data into the data communications session between the client device 120-1 and the server device 130, the authentication manager 150 causes the data communications device 110 to adjust sequence number and/or acknowledgment number information (e.g., used in a TCP data communications session) such that the authentication response packet 123 created and forwarded to the server device 130 by the data communications device 110 does not disrupt or break the data communications session between the client device 120-1 and the server device 130.

In step 204, the authentication manager 150 causes the data communications device 110 to maintain the data communications session between the server device 130 and a client device 120-1 after inserting the authentication response 123 into the data communications session between the client and server devices 120-1 and 130. In other words, the authentication manager 150 maintains the connection in the presence of the inserted authentication response data 123 by making sure that connection information in messages (e.g., packets) exchanged between the client and server from here on for the life of the data communications session are properly adjusted to compensate for the inserted data.

Steps 205 and 206 indicate an example of operations that can be used to maintain the data communications session between the server and client devices.

In step 205, the authentication manager 150 maintains connection state data within the data communications device 110 that tracks an amount of extra data associated with the authentication response 123 that is inserted into the data communications session between the client and server devices 120-1 and 130. An example of such processing as discussed in detail in the aforementioned referenced patent application.

In step 206, in order to compensate for any data inserted into the communications session between the client server devices, the authentication manager 150 modifies connection information within packets (or other units of data) passing through the data communications device 110 that are exchanged between the client device 120-1 and server device 130 using the data communications session in order to allow the client and server devices 120-1 and 130 to maintain proper respective connection states for the data communications session regardless of the amount of extra data added into the data communications session due to the insertion of the authentication response 123 (or authentication information in other messages, as will be explained). In other words, steps 205 and 206 allow the authentication manager to properly adjust sequence and acknowledgment number information within packets associated with a TCP session between the client server devices such that the authentication response 123, created and inserted into the TCP session from the data communications device 110 to the server device 130 in order to authenticate the client device 120-1 for access to the data 140, does not disrupt, confuse or otherwise alter expected values of sequence and acknowledgment numbers as expected by the client and server devices.

In this manner, embodiments of the invention are capable of providing authentication information 160 to server applications 135 that require such information without requiring the client applications 125 (and/or their associated users) to do so. As a result, the data communications device 110 can be configured, for example, with authentication information 160 for a single user account to allow access to many users on many different clients to one or more realms of restricted data 140 associated with a server 130 on the Internet. This single user account can be used to provide authentication responses 123 on behalf of multiple client applications 125 operating in one or more client devices 120-1 through 120-N under the control of one or more users that request access to data or other resources in this realm. In other words, embodiments of the invention allow a group of users such as the employees of a corporation to utilize a single user account for access to restricted data 140. In addition, embodiments of the invention avoid each of the individual users having to enter a valid username and password in order to access the restricted data 140. This significantly avoids account management problems for pay or subscription data services that require user or host name authentication. Since the authentication manager 150 of embodiments of the invention is capable of detecting and intercepting authentication requests 122 before such requests 122 reach the individual client applications 125 operating within the computer network 103, the authentication manager can obtain the appropriate authentication information 160 based on one or more authentication criteria in order to provide a proper authentication response 123.

As an example of the robustness of embodiments of the invention, the authentication information database 160 can include a variety of valid username and password pairs (i.e., can include multiple client accounts). Depending upon which client application 133, or upon which user controlling such client applications, or from which client device 120 the requestor data 121 originates (e.g., based upon network address of the client device), the authentication manager 150 can create an authentication response 123 using certain client account information (i.e., certain authentication information, such as a specific username and password pair) for one group of requesting users or clients that provides a certain level of unrestricted access to the data 140, while creating authentication responses 123 using other client account information (i.e., different authentication information 160) associated with another group of client applications 125 under the control of other users or operating on other client devices 120. As a specific example, embodiments of the invention allow a corporation operating a local area network to provide unrestricted access to data 140 on behalf of executives of the corporation while staff employees that use client devices 120 in a staff area of the computer network 103 (i.e., that are associated with a pool of client network addresses assigned to staff client computers) may only be provided with semi-restricted access to the data 140 by the invention selecting a different set of authentication information 160 depending upon where the request originated form within the LAN network 103. Only two sets of authentication information 160 are required to be configured and maintained to provide such functionality (e.g., a valid username and password pair for the executive level of access and another valid username and password pair for the staff level of access).

The authentication manager 150 can make a determination as to which set of authentication information 160 to provide (i.e., which username and password pair) within an authentication response 123 based upon a variety of authentication criteria such as, for example, the network address of the specific client device 121 requesting access (i.e., providing the requester data 121), a login identity of a user operating a client device 120, a protocol identifier associated with the request for data 121, a client application identifier associated with the client application 133, a destination address of a server device 130 from which the data 140 is requested, the type of data 140 requested, or any other characteristic.

Embodiments of the invention thus save significant amounts of user time by not requiring each user to enter username and password information and can further reduce inefficiencies associated with maintaining separate user accounts for each users requiring access to restricted data 140. Since the authentication information 160 can be maintained in a secure storage area, the system avoids such problems as users forgetting passwords or usernames and users using or providing account information outside of the organization. Implementations can be as simple as providing a single user account as the authentication information 160, in which case the system of the invention uses, on behalf of all users of all client devices 120, the same user account and thus authentication responses 123 contain the same authentication information 160 regardless of who (i.e., which actual user or client device) is asking. Alternatively, implementations can be more complicated as explained in the aforementioned example in which different authentication information 160 is provided within the authentication response 123 based upon various authentication criteria.

Figure 3:
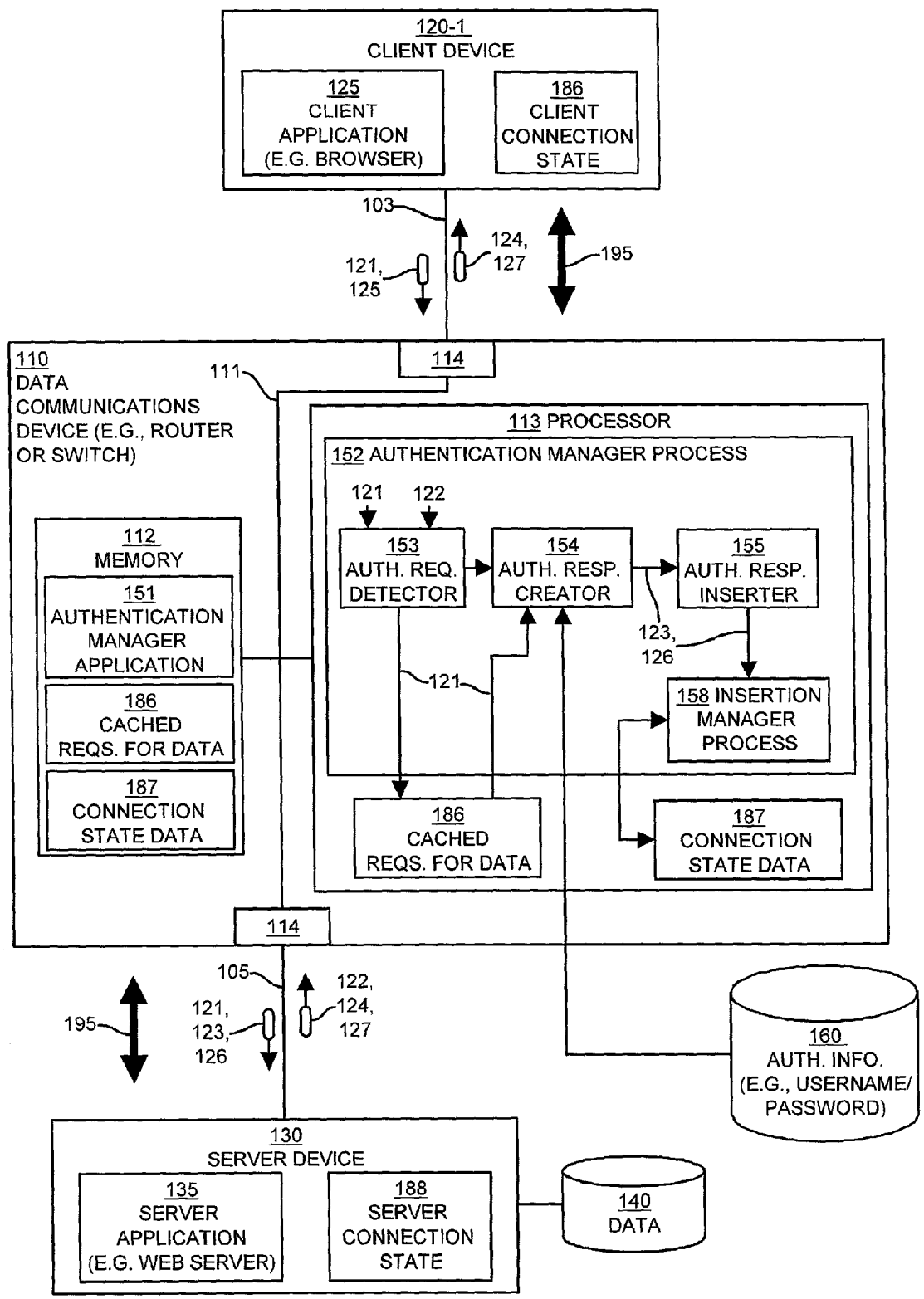
FIG. 3 illustrates an example architecture of a data communications device configured with an authentication manager configured according to one embodiment of the invention.

FIG. 3 illustrates a more detailed architecture of a data communications device 110 configured according to one embodiment of the invention and also illustrates more details concerning the client device 120-1 and the server device 130. In particular, the client device 120-1 includes client connection state information 186 and server device 130 includes server connection state information 188. The data communications session existing between the client device 120-1 and the server device 130 is represented by the arrow 195 and a combination of the client and server connection states 186 and 188 maintained by the client and server devices. In addition, connection state data 187 maintained within the data communications device 110 as will be explained reflects connection information used for the insertion of data not originated from either the client or server device into the data communications session 195. It is to be understood that the data communications session 195 passes through the data communications device 110 and serves as a transport mechanism (e.g., a TCP/IP communications session) for the messages 121 through 127, which may be packets of data (e.g., IP packets) containing information or data formatted according to an application level protocol such as HTTP that is exchanged between the client application 133 and the server application 135.

The data communications device 110 in this example embodiment of the invention includes an interconnection mechanism 111 such as a data bus and/or other circuitry that interconnects a memory 112, a processor 113 and one or more communications interfaces 114.

The memory 112 may be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 112 is encoded with logic instructions (e.g., software code) and/or data that form an authentication manager application 151 configured according to embodiments of the invention. In other words, the authentication manager application 151 represents software code, instructions and/or data that represent or convey the processing logic steps and operations as explained herein and that reside within memory or storage or within any computer readable medium accessible to the data communications device 110.

The processor 113 represents any type of circuitry or processing device such as a central processing unit, microprocessor or application-specific integrated circuit that can access the authentication manager application 151 encoded within the memory 112 over the interconnection mechanism 111 in order to execute, run, interpret, operate or otherwise perform the authentication manager application 151 logic instructions. Doing so forms the authentication manager process 152. In other words, the authentication manager process 152 represents one or more portions of the logic instructions of the authentication manager application 151 while being executed or otherwise performed on, by, or in the processor 113 within the data communications device 110. The authentication manager 150 in FIG. 1 collectively represents either one or both of the authentication manager application 150 and the authentication manager process 152.

The example authentication manager process 152 includes a number of components. In this example embodiment, the authentication manager process 152 includes an authentication requirement detector 153, an authentication response creator 154 and an authentication response inserter 155. Generally, the authentication requirement detector 153 monitors messages (e.g., packets of data) that pass through the data communications device 110 over the data communications session between the client device 121 and the server device 130 in order to detect a requirement for authentication of a request for data sent from a client device to the server device as explained herein. The authentication response creator 154 is generally responsible for creating an authentication response 123 that contains valid authentication information 160 in order to authenticate the client device 120-1 to the server device 130 for access to restricted data 140. The authentication response inserter 155 is generally responsible for interacting with an insertion manager process 158 in order to insert the authentication response 123 into the data communications session 195 for transmission back to the server device 130 for authentication of the client device requesting access to the data 140.

The insertion manager process 158 generally operates according to the techniques disclosed in the aforementioned reference to patent application incorporated by reference herein. The insertion manager process 158 monitors the data communications session 155 and maintains connection state data 187 as explained in the referenced patent application. The insertion manager process 158 can receive the created authentication responses 123 and can manage the insertion of these responses 123 into the data communications session 195 without disruption of the session. In addition, the insertion manager process 158 is responsible for maintaining the data communications session 195 between the server device and the client device in the presence of authentication response information inserted into the session 195. That is, the insertion manager process 158 alters or otherwise adjusts connection information such as TCP sequence numbers and acknowledgment numbers within all messages (i.e., packets) transported over the data communications session 195 between the client device 121 and server device 130 in order to compensate for authentication information and authentication responses inserted into the data communications session 195. The insertion manager process 158 thus maintains connection state data 187 which tracks the amount of extra data added to the data communications session 195 due to insertion of authentication information into client requests for data and authentication responses sent as a result of receiving authentication requests 123.

Figure 4:
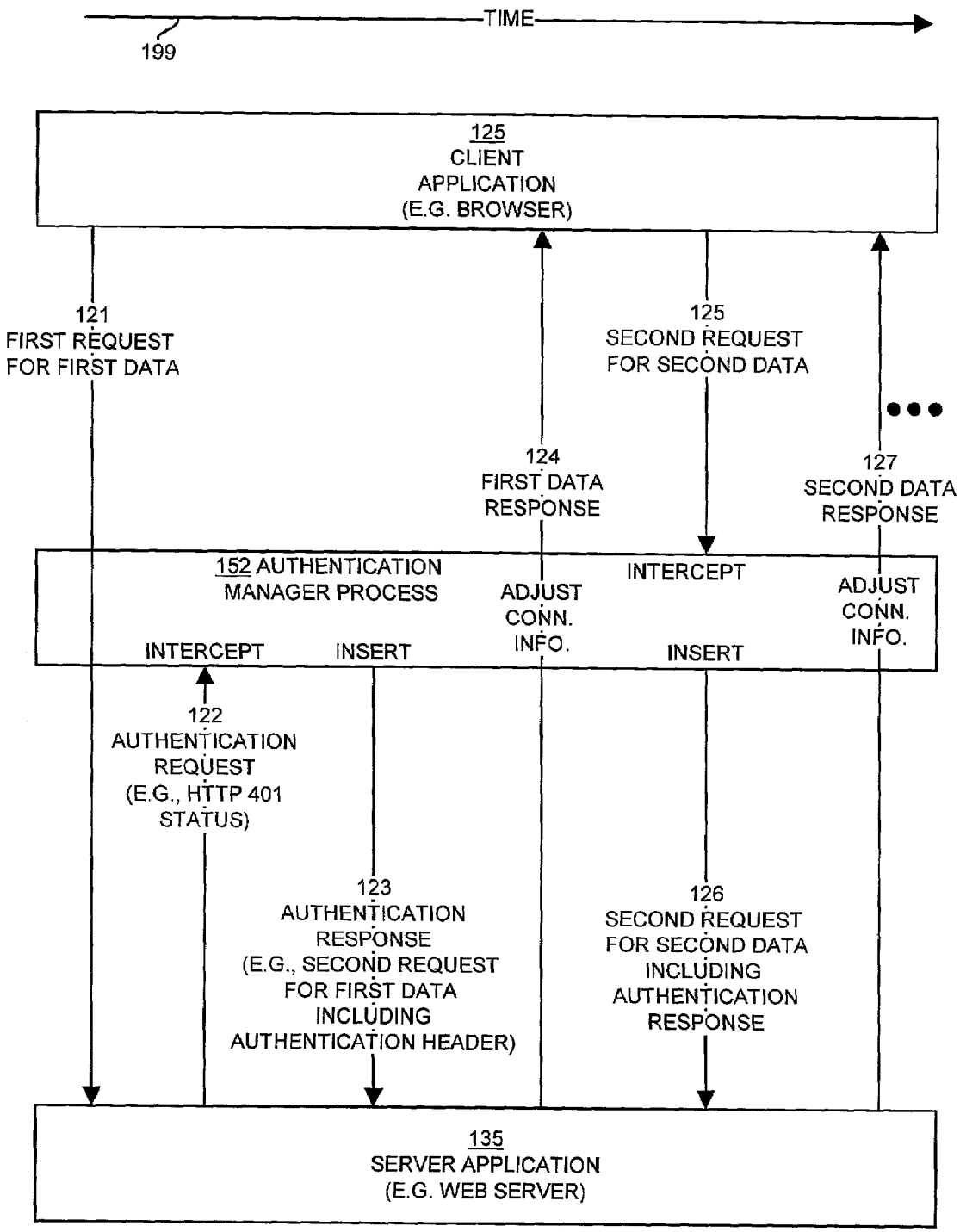
FIG. 4 illustrates an example of a flow of messages that take place over time between a client application, an authentication manager configured to operate according to an embodiment of the invention, and a server application.

FIG. 4 illustrates another example of an exchange of messages that takes place between the client application 133, the authentication manager 150 and the server application 135 over a data communications session 195 (FIG. 3) according to one embodiment of the invention. In the illustration in FIG. 4, time progresses from left to right and the numerical references for each message generally indicate the order in which those messages exist (e.g., are created and transmitted) over the data communications session 195.

The discussion of the exchange of messages between the components illustrated in FIG. 3 will be described in conjunction with an explanation of processing steps in the flow charts in FIGS. 5 and 6, which illustrate another more detailed example of the processing of an authentication manager 150 configured according to embodiments of the invention.

Figure 5:
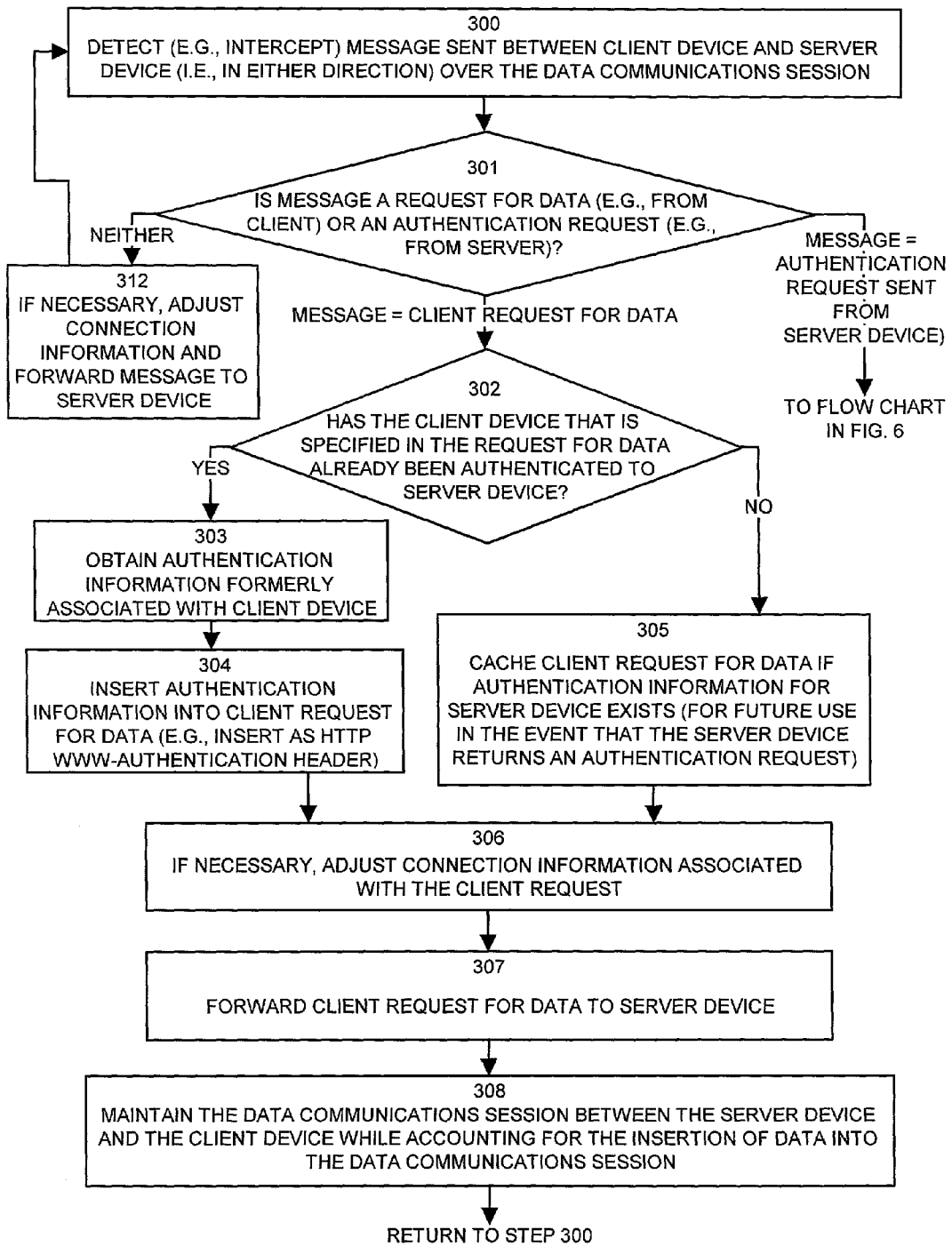
FIGS. 5 and 6 illustrate a flow chart of processing steps that show a detailed operation of an authentication manager configured according to one example embodiment of the invention.

In FIG. 5 at step 300, the authentication manager process 152 detects (e.g., intercepts) a message sent between the client device 120-1 (i.e., client application 133) and the server device 130 (i.e., server application 135) over the data communications session 195. Assume for this example that the client application 133 and the server application 135 have opened a TCP session and are involved in an HTTP communications session. The message detected in step 300 may be any type of message sent between the client and the server. The authentication requirement detector 153 operating within the authentication manager process 152 can monitor or snoop the messages transported over the data communications session 195 and upon detection of a message, processing proceeds to step 301.

In step 301, the authentication manager process 152 determines if the message detected over the data communications session 195 is a request for data (e.g., 121) from a client (e.g., 120), or, alternatively, is an authentication request (e.g., 122) from a server 130. If the message detected in step 300 is neither a request for data 121 nor an authentication request 122, processing proceeds to step 312 at which point the authentication manager process 152 causes the data communications device 110 to adjust connection information within the message, if necessary, and to forward the message to the server device 130 at which point processing returns to step 300.

Alternatively, if in step 301 the message detected in step 300 is an authentication request 122 from the server application 135, processing proceeds to the flow chart of processing steps illustrated in FIG. 6, which will be discussed in detail shortly.

Assume at this point in this example that the message detected and intercepted in step 300 is the first request for first data 121 (e.g., an HTTP GET request) sent from the client application 133 to the server application 135 as illustrated in FIG. 4. Further assume for this example that the first request for first data 121 is a request by the client application 133 to access restricted data 140 that requires authentication of the client device 120-1 (e.g., of the user operating the client application 133) by the server device 130 (i.e., by the server application 135) to which the request is directed prior to granting access to the data. Since the message in step 301 is a request for data 121, authentication manager processing proceeds to step 302.

In step 302, the authentication manager process 152 (e.g., the authentication requirement detector 153) determines if the client device (e.g., 120-1) that is specified in the request for data (i.e., the client device 120 from which the request originates) has already been authenticated to the server device 130 to which the request for data 121 is directed. That is, in step 302, the authentication manager process 152 determines if an authentication procedure has already been performed between the client and server devices 120-1 and 130 over the data commutation session 195. In the example in FIG. 4, the since the request 121 is a first request for first data to the server device 130, assume for this example that the client application 133 has not yet been authenticated to the server application 135. Accordingly, processing proceeds from step 302 to step 305.

As an alternative to step 302, the authentication manager process 152 can determines if an authentication procedure has already been performed to the server device 130 to which the request for data 121 is directed, without regard to the client device 120-1 that originated the request for data 121.

Assuming no authentication information has been provided to the server device 130 for either this client 120-1 on this data communications session 195, in step 305, the authentication manager process 152 caches the client request for data 121 for future use, in the event that the server device 130 (i.e., the server application 135) returns an authentication request 122 requesting that the client device authenticate itself prior to granting access to the requested data. In other words, in step 305, the authentication manager process 152 saves a copy of the first request for first data 121 associated with the data communications session 195 (i.e., associated with the session between the client device 120-1 and the server device 130). In one implementation of step 305, the data communications device determines is authentication information is accessible that is associated with the server device to which the request for data is directed. In this manner, the data communications device only caches requests for which it can provide a valid authentication response to an authentication request. The data communications device can check, for example, the IP address or the "Hosts:" for of an HTTP GET Request packet to determine the identity of the server to which the request is directed. Once this identity is known, the data communications device can check this against its database of authentication information to determine if such information is available for this server device.

Next, in step 306, if necessary, the authentication manager process 152 adjusts connection information associated with the client requests 121. One purpose of the processing in step 306 is to compensate for any authentication information that has previously been inserted into the data communications session 195 between the client and server devices. Since in this example (i.e., the example in FIG. 4) the request 121 is a first request for first data over the data communications session 195 from the client 120-1, no adjustment to connection information the necessary in step 306 since no information has yet been inserted by the authentication manager process 152 into the data communications session 195. As such processing proceeds to step 307.

Next, in step 307, the authentication manager process 152 forwards the client request for data 121 to the server device 130. The server device 130 in this example thus receives an unauthenticated request for data 121.

In step 308, the authentication manager process 152 maintains the data communications session between the server device 130 and the client device 121 while accounting for the insertion of each authentication response inserted into the data communications session 195. Since in this example, no authentication information has yet been inserted into the data communications session, the processing in step 308 does not need to alter any other messages which may transpire over the data communications session 195 between the client and server. After processing step 308, processing returns to step 300.

Referring back to the example exchange of messages in FIG. 4, assume that the first request for first data 121 contains a request to access the data 140 that is restricted data for which the server device 130 requires authentication of any client device 120 requiring access to such data 140. Accordingly, in response to receiving the first request for first data 121, the server application 135 operating within the server device 130 returns, towards the client device 120-1 providing the request 121, an authentication request message 122 such as an HTTP 401 status message that indicates that the server application 135 requires authentication information from the client application 133 (i.e., from a user controlling the client application) in order to grant access to the requested data 140. As the authentication request message 122 propagates through the network 105 and passes through the data communications device 110, the authentication requirement detector 153 detects the authentication request message 122 in the next generation of step 300 at the top of FIG. 5.

In this next iteration of step 300, processing proceeds as explained above to step 301 where the authentication manager 150 determines that the message is an authentication request 122 sent from a server application 135 over the data communications session 195 towards the client device 120-1. Accordingly, in step 301, processing proceeds to step 309 in the flow chart in FIG. 6.

Figure 6:
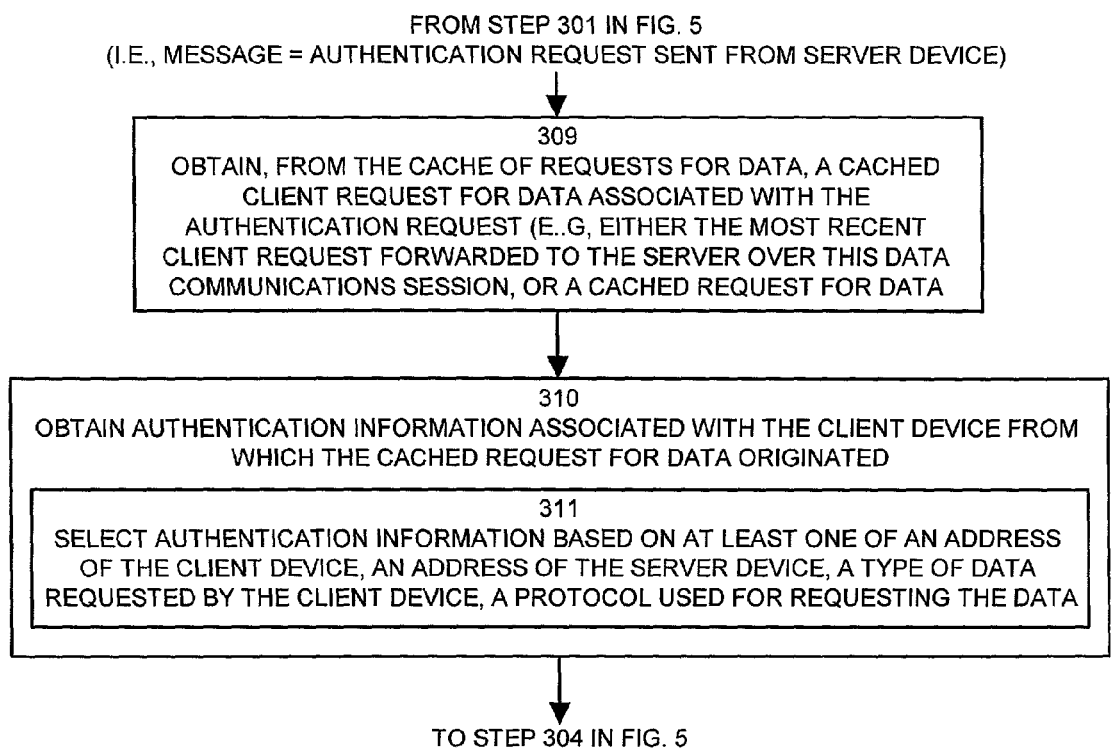

Referring now to step 309 in FIG. 6, the authentication manager process 152, which is now in possession of the authentication request 122 sent from the server device 130 (i.e., from the server application 135), obtains, from a cache of requests for data 186 (FIG. 3), a copy of the first client request for first data 121 associated with the authentication request 122. in order to obtain the proper request for data 121 from the cache 186, the authentication manager process 152 can, for example, obtain the most recent client request for data 121 forwarded to the server (i.e., the server that originated the authentication request 122 which was just intercepted) over the data communications session 195, or, the authentication manager process 152 can obtain from the cache 186 the request for data 121 based on a database of cached requests for data 186 that maps requests 121 to data communications sessions 195, or the proper request can be obtained based upon information identifying the failed request 121 which may be contained within the intercepted authentication request 122. That is, the processing of step 309 causes the authentication manager process 152 to obtain a client request for data 121 that caused the server device to generate the authentication request 122. As such, the processing of step 309 causes the authentication manager process 152 to obtain a request for data 121 that was formerly cached in step 305 and that corresponds to the authentication request 122 sent from the server application 135 in response to receiving that request for data 121 which contained a request to access data which requires authentication of the client device that originated the request 121.

Next, in step 310, the authentication manager process 152 obtains authentication information 160 such as a username and password associated with the client device 120-1 for which the cached request for data 121 originated. In other words, according to the processing steps 309 and 310, when the authentication manager process 152 is in receipt of an authentication request 122 from a server device 130, the authentication manager 150 (FIG. 1) obtains (step 309), from the cache of formerly made requests 186, the appropriate request for data 121 which caused the server device to generate the authentication request 122, and then in step 310 obtains appropriate authentication information 160 which can be used to authenticate the request to the server device 130 which provided the authentication request 122.

Sub-step 311 indicates an example of various techniques by which the authentication manager process 152 can select proper authentication information 160 based on various authentication criteria. In particular, the authentication manager process 152 can select authentication information 160 based upon any one or more of an address (e.g., IP address) of the client device 120 to which the authentication request 122 is directed, an address of the server device 130 which originated the authentication request 122, a type of data requested in the request 121 by the client device 120 (i.e., by the client application 133), or a protocol used for requesting the data such as HTTP. In other words, depending on any one or more of these authentication criteria, the authentication manager process 152 (i.e., specifically, the authentication response creator 154 in FIG. 3) obtains or otherwise accesses appropriate authentication information 160 (from possibly many sets of such information) which will be used to create or otherwise formulate a valid authentication response 123 which includes this authentication information 160 in order to authenticate access to the data by the client device that provided the original request for data 121 to the server device 130. After processing steps 310 and 311, processing proceeds back to step 304 in FIG. 5.

Referring now to step 304 in FIG. 5, the authentication manager process 152 inserts the authentication information 160 into the client request for data 121 (i.e., the client request obtained from the cache in step 309 for this iteration of processing). As an example of step 304, the authentication response creator 154 inserts the authentication information 160 as an HTTP WWW-authentication header into the request for data 121 obtained from a cache. Essentially, step 304 thus re-creates another version of the first request for first data 121 that now includes authentication information 160 that the server device 130 can use to accept the request in order to grant access to the requested data 140. After processing step 304, processing proceeds to step 306.

In step 306, for this iteration of processing, the authentication manager process 152, and more specifically, the insertion manager process 158 in conjunction with the authentication response inserter 155, operate to adjust connection information associated with the client request created or generated in step 304 in order to account for the insertion of i) the authentication information 160 and ii) the re-created client request itself, that are soon to be inserted into the data communications session 195. That is, since the processing of step 304 essentially creates a new request for data which now contains authentication information 160, and since this request was not actually generated by the client device 120, this new request for data now containing the authentication information 160 requires that connection information be adjusted in a packet header of the new request in order to compensate for this additional data which is to be inserted into the data communications session 195. The total amount of extra data by which the connection information such as TCP sequence and acknowledgment information in a packet header must be adjusted is generally equal to the total amount data of the request for data which now contains not only the original request for data 121 (as retrieved from the cache 186) but also contains the required authentication information 160. After processing step 306, the authentication manager process 152 has created a complete second request for the first data that includes an authentication header containing the authentication information 160. Processing then proceeds from step 306 to step 307.

In step 307, the authentication manager process 152 forwards this newly created second request for the first data 123 (see FIG. 4) to the server device 130 (i.e., to the server application 135) as an authentication response 123. In this manner, after processing step 307, the server application 135 now receives the authentication response 123 which contains a copy of the first request for first data 121 (referred to as a second request for this example) as well as the required authentication information 160 allowing the server application 135 to grant access to the data requested in the request 123. As illustrated in FIG. 4, in response, the server application 135 then obtains the requested data and returns this data as a first data response 124 back towards the client application 133 over the data communications session 195.

Note that since the first data response 124 is a message returned over the data communications session 195 and passes through the data communications device 110, processing in FIG. 5 is again repeated and steps 300 and 301 operate to direct processing to step 312, since the first data response message 124 is neither a request for data from a client device nor is this message 124 an authentication request from a server. However, in step 312, since the authentication manager process 152 has now inserted extra data into the data communications session 195 between the client and server devices (the extra data being the authentication response 123), this iteration of step 312 causes the authentication manager process 152 to utilize the insertion manager process 158 in order to adjust connection information associated with the data communications session 195 (i.e., to adjust sequence and acknowledgment information within the first data response 124) such that the first data response 124 will be correctly received by the client application 133. In other words, upon return of the first data response 124 for the server application 135 to the client application 133, the authentication manager process 152 configured according to this embodiment of the invention utilizes the technology disclosed in the aforementioned referenced patent application in order to adjust packet header information within the first data response 124 in order to compensate for the extra data (i.e., the authentication response 123) which was formerly inserted into the data communications session 195. The client device 130 thus receives the first data response containing the data 140 requested in the first request for data 121, without requiring the client device 130 or the user to enter any authentication information. The client device 120-1, client application 133, and the user need not even be aware that authentication was required to access the requested data. In addition, even if the user is aware of the aforementioned processing, the user is still unable to obtain the required authentication information for personal use or unauthorized distribution.

Continuing with the example illustration in FIG. 4, assume now that the client application 133 provides a second request for second data 125 onto the network 103 (FIG. 1) for receipt by the server application 135 operating in the server device 130. Since the second request for second data 125 is a message that is transported over the data communications session 195, the authentication manager process 152 operates according to another iteration of the processing illustrated in FIG. 5.

In this next iteration, in step 300, the authentication manager process 152 detects the message 125 (i.e., the second request for second data) sent between the client and server devices over the data communications session 195 and in step 301, since this message 125 is a request for data, processing proceeds to step 302.

In this iteration of step 302, the authentication manager process 152 determines that the client device 120-1 that is specified in the request 125 (i.e., the client device 120-11 operating the client application 133 that originated the second request for second data 125) has already been authenticated to the server device 130 to which the second request for second data 125 is directed. In other words, in step 302, the authentication manager process 152 determines that the data communications session 195 has already been authorized to the server device 130. This determination may be made, for example, by checking a flag or other signal, data structure or other indication that identifies that an authentication response 123 has already been forwarded to the server application 135 on behalf of this data communications session 195 and on behalf of this client device 120-1. In other words, upon generation of the first authentication response 123 as discussed above, the authentication manager process 152 can set a flag indicating that the client device 120 associated with this data communications session 195 has previously been authenticated to the server device 130. This flag or other indication can be checked in step 302 to pass processing to step 303. Since the client device has already been authenticated to the server device according to the aforementioned example processing, processing proceeds to step 303.

In step 303, the authentication manager process 152 obtains authentication information 160 that was formerly associated with the client device 120-1 from which the second request for second data 125 originated. In other words, since the processing formerly explained with respect to step 310 obtains authentication information 160 associated with the client device for a former request for data, this authentication information is now associated with that client device and is again obtained by the authentication manager process 152 in step 303.

Processing then proceeds to step 304 which, as previously described, inserts the authentication information 160 into the client request for data which is the second request for second data 125 in the example in FIG. 4.

Next, the processing of steps 306, 307 and 308 proceeds as previously explained in order to adjust packet header connection information such as TCP sequence and acknowledgment numbers within the request for data 125 in order to compensate for the authentication information 160 inserted into the request 125 in step 304. Then, in step 307, the authentication manager process 120 forwards the modified client request, now referred to as request 126 since it now contains the necessary authorization information 160, to the server application 135 and then maintains (in step 308) the data communications session between the client and server devices while accounting for the insertion of authentication information.

Upon receipt of the second request for second data 126 that now contains the authentication information 160, the server application 135 returns a second data response 127 which, just as the first data response 124, passes through the data communications device 110 at which point the insertion manager process 158 modifies connection state information within the second data response 127 (i.e., in step 312) before forwarding the response back to the client 120-1 in order to compensate for all information has been previously inserted into the data communications session 195.

Processing continues in this manner for each subsequent request for data received from the client device 120-1 over the data communications session 195 for receipt by the server device 130 (i.e., by the server application 135). That is, the authentication manager process 152 automatically intercepts any further requests for data from the client application 133 and automatically inserts the appropriate authentication information 160 into such request and then forwards such requests to the server application 135 while adjusting connection information associated with such requests and associated with data response is to such requests such that the client and server connection state 186 and 188 (FIG. 3) are not disrupted. Return data served by the server is adjust in step 312 and forwarded back to the client as well.

In this manner, embodiments of the authentication manager 150 can provide for automatic authentication of client request for data to a server without interaction required by the client. In addition, since the authentication information 160 is managed for access by the data communications device 110 on behalf of client devices 120 and client application 133, embodiments of the invention provide a centralized management scheme for authentication information 160. This avoids having to require each user of each client application 133 to enter a username and password when requesting restricted data from a server. In addition, the Corporation them in many users really need to pay for the subscription of a single user account to a pay the information service offered by a server device 130. Using only this paid subscription account, multiple users within the Corporation on different client devices 120 male request access to the information and embodiments of the invention can operate to provide the proper authentication information related to the single user account the letter which client devices 120 a requesting such access on behalf of which users. In addition, embodiments of the invention allow different authorization information to be provided to a server application 135 depending in various authentication criteria such as which users are requesting access.

It is to be understood that this example set of messages illustrated in previously described embodiments of the invention are capable of providing authentication responses 123 on behalf of clients requesting data using a specific sequence of messages. The sequence illustrated in FIG. 4, for example, generally relates to the operation of a protocol such as the hypertext transport protocol (HTTP) in which case the requirement for authentication to the request for data is detected based upon the authentication request 120 to return for the server applications 135. Those skilled in the art will understand that there are other techniques for detecting a requirement for authentication of a request for data (i.e., step 201 FIG. 2) which may be utilized by embodiments of the invention. As an example, and authentication manager 150 might monitor and analyze all requests for data 121 sent from the client application 133 to the server applications 135. Depending upon which data is requested, the authentication manager 150 might detect that a request for certain data will require authentication information 160 to be inserted into the request 121 since the server application 135 will require such authentication information 160 in order to grant the request. That is, certain protocols may not provide for authentication requests (i.e., rejections) that are sent from the server application 135 back towards the client application 133. Such protocols may instead require that any required authentication information 160 be provided within the initial request for data if that data is restricted. As such, is to be understood that the authentication manager 150 is capable of detecting this type of requirement for authentication of a request for data and in such cases the authentication response 123 includes the original request for data 121 as well as the addition of authentication information 160 which will be required by the server application 135 to grant access to the requester data specified in the request 121 containing the authentication data 160.

Those skilled in the art will understand that there can be many variations made to the embodiments explained above while still achieving the same objective of those embodiments and the invention in general. As an example, referring to steps 303 and 304 in FIG. 5, in an alternative configuration, processing can proceed from step 304 to step 305 prior to performing steps 306 through 308. In this manner, even requests for data to a server that has already obtained authentication information are cached in a database of requests 186. Maintaining a collection of all (e.g., all recent) requests, even those that that include authentication information, may be helpful in the event that a request attempts to access a portion data in the server device for which the current authentication information 160 associated with the data communications session 195 (i.e., currently inserted into requests to this server) is invalid. As a result of such an attempt to access data requiring a higher level of access, the server device 130 will provide an authentication request (e.g., 123) back towards the client device indicating an invalid request was made that requires authentication (i.e., that the authentication information provided was insufficient).

Accordingly, in this alternative embodiment of the invention, if the authentication manager 150 receives an authentication request for a data communications session to a server device 130 that has previously already been authenticated, the authentication manager can assume that the level of authentication provided in the most recent request is insufficient for the access required or requested. As a result of this determination, the authentication manager 150 can, for example, substitute the authentication information 160 contained in the most recent cached request with new authentication information offering a higher level of access to data 140 within the server device 130, assuming the authentication manager allows such a higher level of access (e.g., depending upon which client is requesting the data). In other words, this alternative configuration can account for situations in which initial selection of the authentication information 160 to be included within client requests for data suffices for access to an initial set of requested data 140, but is insufficient for access to all data 140 (e.g., data in a different realm but maintained by the same server). In such cases, the client may provide a series of requests for which the authentication manager 150 uses a first set of authentication information 160 providing a lower level of access to the data 140 but then, upon receipt of a rejected client request, the authentication manager can use the failed (but cached) request to re-request the same data but including different authentication information 160 specifying a higher level of access.

By caching all recent requests for data, the authentication manager 150 can thus compare an already authenticated data communications session to determine the current level of access granted to the data by the server device. Based on this information, the authentication manager can determine that a higher level of access is required and can thus utilize authorization information 160 that provides different privileges within a realm or realms maintained by the server device 130.

In another alternative embodiment, various schemes can be used to provide for different levels of authentication hierarchy. As an example, when the data communications device employing embodiments of the invention as discussed above receives an authentication request from a server, when the data communications device accesses the authentication information for that server, the authentication information may indicate that a specific username and/or password must first be provided to the data communications device from the user of the client device in order to authenticate access by the user of the client to the data communications device. This username and/or password combination can be different than the username and password used to actually reply to the server in the authentication response from the data communications device.

In this manner, only those persons operating clients that are aware of a valid password to access the data communications device can access such the server through the data communications device. However, those same people authorized to access the service inside, for example, the corporation where they work that operates the data communications device configured according to this embodiment, will not be allowed to access the server directly, for example from home, since the password provided from the user to the data communications device (required in this example for the data communications device to send a valid authentication response to the server device) within the company is different than the password sent to the actual server.

Those skilled in the art understand that various other combinations of passwords (e.g., separate groups of user accounts) can be used to further define security access privileges for users. Such user or access accounts can be different from the actual account or accounts maintained as the authentication information for which the data communications device of the invention sends to a server device within a authentication response. Such variations are intended to be covered by the scope of this invention. As such, the foregoing description of embodiments of the invention is not intended to be limiting. Rather, any limitations to the invention are presented in the following claims.

What is claimed is:

1. In a data communications device, a method providing authentication of a client device to a server device, the method comprising the steps of:
    detecting a requirement for authentication of a request for data sent from a client device to a server device;
    creating an authentication response in response to the step of detecting the requirement for authentication, the authentication response containing authentication information required by the server device to allow the client device to access data via the server device;
    inserting the authentication response into the data communications session between the client device and the server device, the authentication response authenticating, to the server device, access to the data by the client device;
    maintaining the data communications session between the server device and the client device in the presence of authentication response information inserted into the data communications session between the client device and the server device by:
        maintaining connection state data in the data communications device that tracks an amount of extra data associated with the authentication response that is inserted into the data communications session between the client device and the server device; and
        modifying connection information within packets passing through the data communications device that are exchanged between the client device and server device using the data communications session in order to allow the client and server device to maintain proper respective first and second connection states for the data communications session regardless of the amount of extra data added in the data communications session due to insertion of the authentication response.

2. The method of claim 1 wherein the step of detecting a requirement for authentication of a request for data sent from a client device to a server device comprises the step of:
    detecting, in a data communications session between a client device and a server device, an authentication request sent from the server device to the client device for authentication of the client device by the server device.

3. The method of claim 2 wherein the step of detecting an authentication request comprises the step of:
    intercepting an unauthorized response sent from the server device to the client device over the data communications session, the unauthorized response indicating that the server device requires authentication of the client device in order for the client device to access the data using the server device.

4. The method of claim 3 wherein the unauthorized response from the server device is generated by the server device in response to an unauthenticated request for data sent from the client device to the server device over the data communications session.

5. The method of claim 1 wherein the step of detecting a requirement for authentication of a request for data sent from a client device to a server device comprises the steps of:
    detecting, in a data communications session between a client device and a server device, a request for data sent from a client device to a server device for access to data using the server device;
    caching the request for data in the data communications device; and
    detecting, in the data communications session between a client device and a server device, an authentication request sent from the server device to the client device for authentication of the request for data sent from the client device to the server device.

6. The method of claim 1 wherein the step of creating an authentication response comprises the steps of:
    obtaining authentication information associated with the client device, the authentication information capable of authorizing, on behalf of the client device, access to the data using the server device; and
    incorporating the authentication information into the authentication response such that the authentication response, when received by the server device due to the step of inserting, allows the server device to authenticate access, by the client device, to data using the server device.

7. The method of claim 6 wherein:
    the authentication information is access control information; and
    wherein the step of incorporating comprises the steps of:
    placing the access control information into an authentication header of a packet of data serving as the authentication response to allow the client device to access restricted data using the server device;
    adjusting connection information associated with the packet of data to account for the authentication information incorporated into the authentication response; and
    formatting the authentication response to appear as though it originated from the client device.

8. The method of claim 1 wherein:
    the authentication response is a packet including an authentication header containing the authentication information and is created by the data communications device to appear as though it originated from the client device; and
    wherein the step of inserting the authentication response into the data communications session between the client device and the server device comprises the step of forwarding the authentication response to the server device over the data communication session as at least one packet of extra data, the authentication response being formatted to appear as though it originated from the client device.

9. The method claim 1 wherein the steps of detecting, creating, inserting and maintaining are performed by the data communications device without assistance from the client device and are performed such that the data communications session between the client device and the server device is free from disruption due to authentication requirements of the client device to the server device.

10. The method of claim 1 wherein:
the steps of detecting, creating, inserting and maintaining are repeated for at least a first and second iteration; and wherein for the first iteration:
the step of detecting a requirement for authentication of a request for data comprises the step of detecting an authentication request sent over the data communications session from the server device to the client device in response to the client device providing a first request for access to data using the server device; and
wherein for the first iteration, the step of creating an authentication response comprises the steps of recreating the first request for access to first data and placing authentication information into the recreated first request to allow the server device to authenticate the recreated first request upon being received by the server device in the step of inserting.

11. The method of claim 10 wherein, for the second iteration of the steps of detecting, creating, inserting and maintaining:
the step of detecting a requirement for authentication of a request for data comprises the step of detecting a second request for access to data sent from the client device to the server device; and
wherein for the second iteration, the step of creating an authentication response comprises the steps of:
intercepting the second request for access to data; and
generating an authentication response by inserting the authentication information as an authentication header into the second request to allow the server device to authenticate the second request for data on behalf of the client device without requiring generation of an authentication request; and
wherein for the second iteration, the step of inserting the authentication response into the data communications session between the client device and the server device comprises the step of:
forwarding the second request containing the authentication header to the server device such that the server device can authenticate the second request.

12. The method of claim 1 wherein the step of detecting a requirement for authentication of a request for data sent from a client device to a server device comprises at least one of the steps of:
a) detecting an authentication request being transmitted from a server device through the data communications device to a client device in response to the client device providing a first request for data to the server device that requires authentication by the server device; and
b) detecting a second request for data being transmitted through the data communications device from the client device to the server device and detecting that the client device provided a first request for data to the same server device.

13. The method of claim 1 wherein:
the data communications session is a transmission control protocol session between the client device and the server device; and
wherein the step of maintaining modifies connection information within messages exchanged between the client device and the service device to account for the insertion of authentication information inserted into the data communications session in order to provide automatic authentication of requests for data sent to the server device on behalf of client devices.

14. The method of claim 13 wherein:
the data communications session is a single transmission control protocol session between the client device and the server device and utilizes a single application layer protocol; and
wherein the step of maintaining modifies connection information within messages exchanged between the client device and the service device to account for the insertion of authentication information inserted into the data communications session in order to provide automatic authentication of requests for data sent to the server device on behalf of client devices.

15. The method of claim 1 wherein the steps of detecting, creating, inserting and maintaining are performed on behalf of a plurality of client devices and wherein the authentication information is selected in the step of creating from different sets of authentication information based on at least one of an address of the client device, an address of the server device, a type of data specified in the request, and a protocol used to provide the request.

16. The method of claim 1 wherein the data communications device is a device operating in a network to which hypertext transport protocol traffic is redirected to perform the steps of detecting, creating, inserting and maintaining.

17. A data communications device comprising:
at least one communications interface;
a memory;
a processor; and
an interconnection mechanism coupling the at least one communications interface, the memory and the processor;
wherein the memory is encoded with an authentication manager application that when performed on the processor, produces an authentication manager process that causes the data communications device to provide authentication of a client device to a server device by performing the operations of:
detecting a requirement for authentication of a request for data sent from a client device to a server device;
creating an authentication response in response to the step of detecting the requirement for authentication, the authentication response containing authentication information required by the server device to allow the client device to access data via the server device;
inserting the authentication response into the data communications session between the client device and the server device on the at least one communications interface, the authentication response authenticating, to the server device, access to the data by the client device;
maintaining the data communications session between the server device and the client device in the presence of authentication response information inserted into the data communications session between the client device and the server device by:
maintaining connection state data in the data communications device that tracks an amount of extra data associated with the authentication response that is inserted into the data communications session between the client device and the server device; and
modifying connection information within packets passing through the data communications device that are exchanged between the client device and server device using the data communications session in order to allow the client and server device to maintain proper respective first and second connection states for the data communications session regardless of the amount of extra data added in the data communications session due to insertion of the authentication response.

18. The data communications device of claim 17 wherein when the authentication manager process causes the data communications device to perform the step of detecting a requirement for authentication of a request for data sent from a client device to a server device, the authentication manager process causes the data communications device to perform the step of:
   detecting, in a data communications session between a client device and a server device passing through the at least one communications interface, an authentication request sent from the server device to the client device for authentication of the client device by the server device.

19. The data communications device of claim 18 wherein when the authentication manager process causes the data communications device to perform the step of detecting an authentication request, the authentication manager process causes the data communications device to perform the step of:
   intercepting, on the at least one communications interface, an unauthorized response sent from the server device to the client device over the data communications session, the unauthorized response indicating that the server device requires authentication of the client device in order for the client device to access the data using the server device.

20. The data communications device of claim 19 wherein the unauthorized response from the server device is generated by the server device in response to an unauthenticated request for data sent from the client device to the server device over the data communications session.

21. The data communications device of claim 17 wherein when the authentication manager process causes the data communications device to perform the step of detecting a requirement for authentication of a request for data sent from a client device to a server device, the authentication manager process causes the data communications device to perform the step of:
   detecting, in a data communications session between a client device and a server device, a request for data sent from a client device to a server device for access to data using the server device;
   caching the request for data in the data communications device; and
   detecting, in the data communications session between a client device and a server device, an authentication request sent from the server device to the client device for authentication of the request for data sent from the client device to the server device.

22. The data communications device of claim 17 wherein when the authentication manager process causes the data communications device to perform the step of creating an authentication response, the authentication manager process causes the data communications device to perform the step of:
   obtaining authentication information associated with the client device, the authentication information capable of authorizing, on behalf of the client device, access to the data using the server device; and
   incorporating the authentication information into the authentication response such that the authentication response, when received by the server device due to the step of inserting, allows the server device to authenticate access, by the client device, to data using the server device.

23. The data communications device of claim 22 wherein:
   the authentication information is access control information; and
   wherein when the authentication manager process causes the data communications device to perform the step of incorporating, the authentication manager process causes the data communications device to perform the steps of:
   placing the access control information into an authentication header of a packet of data serving as the authentication response to allow the client device to access restricted data using the server device;
   adjusting connection information associated with the packet of data to account for the authentication information incorporated into the authentication response; and
   formatting the authentication response to appear as though it originated from the client device.

24. The data communications device of claim 17 wherein:
   the authentication response is a packet including an authentication header containing the authentication information and is created by the data communications device to appear as though it originated from the client device; and
   wherein when the authentication manager process causes the data communications device to perform the step of inserting the authentication response into the data communications session between the client device and the server device, wherein when the authentication manager process causes the data communications device to perform the step of forwarding the authentication response to the server device over the data communication session as at least one packet of extra data, the authentication response being formatted to appear as though it originated from the client device.

25. The data communications device claim 17 wherein the steps of detecting, creating, inserting and maintaining are performed by the data communications device without assistance from the client device and are performed such that the data communications session between the client device and the server device is free from disruption due to authentication requirements of the client device to the server device.

26. The data communications device of claim 17 wherein:
   the authentication manager causes the data communications device to repeat the steps of detecting, creating, inserting and maintaining for at least a first and second iteration; and
   wherein for the first iteration:
   when the authentication manager process causes the data communications device to perform the step of detecting a requirement for authentication of a request for data, the authentication manager process causes the data communications device to perform the step of detecting an authentication request sent over the data communications session from the server device to the client device in response to the client device providing a first request for access to data using the server device; and
   wherein for the first iteration, when the authentication manager process causes the data communications device to perform the step of creating an authentication response, the authentication manager process causes the data communications device to perform the steps of recreating the first request for access to first data and placing authentication information into the recreated first request to allow the server device to authenticate the recreated first request upon begin received by the server device in the step of inserting.

27. The data communications device of claim 26 wherein, for the second iteration of the steps of detecting, creating, inserting and maintaining:
when the authentication manager process causes the data communications device to perform the step of detecting a requirement for authentication of a request for data, the authentication manager process causes the data communications device to perform the step of detecting a second request for access to data sent from the client device to the server device; and
wherein for the second iteration, when the authentication manager process causes the data communications device to perform the step of creating an authentication response, the authentication manager process causes the data communications device to perform the steps of:
intercepting the second request for access to data; and
generating an authentication response by inserting the authentication information as an authentication header into the second request to allow the server device to authenticate the second request for data on behalf of the client device without requiring generation of an authentication request; and
wherein for the second iteration, the authentication manager process causes the data communications device to perform the step of inserting the authentication response into the data communications session between the client device and the server device, the authentication manager process causes the data communications device to perform the step of:
forwarding the second request containing the authentication header to the server device such that the server device can authenticate the second request.

28. The data communications device of claim 17 wherein when the authentication manager process causes the data communications device to perform the step of detecting a requirement for authentication of a request for data sent from a client device to a server device, the authentication manager process causes the data communications device to perform at least one of the steps of:
a) detecting an authentication request being transmitted from a server device through the data communications device to a client device in response to the client device providing a first request for data to the server device that requires authentication by the server device; and
b) detecting a second request for data being transmitted through the data communications device from the client device to the server device and detecting that the client device provided a first request for data to the same server device.

29. The data communications device of claim 17 wherein:
the data communications session is a transmission control protocol session between the client device and the server device; and
wherein when the authentication manager process causes the data communications device to perform the step of maintaining, the data communications device modifies connection information within messages exchanged between the client device and the service device over the at least one communications interface to account for the insertion of authentication information inserted into the data communications session in order to provide automatic authentication of requests for data sent to the server device on behalf of client devices.

30. The data communications device of claim 29 wherein:
the data communications session is a single transmission control protocol session between the client device and the server device and utilizes a single application layer protocol; and
wherein when the authentication manager process causes the data communications device to perform the step of maintaining, the data communications device modifies connection information within messages exchanged between the client device and the service device over the at least one communications interface to account for the insertion of authentication information inserted into the data communications session in order to provide automatic authentication of requests for data sent to the server device on behalf of client devices.

31. The data communications device of claim 17 wherein the steps of detecting, creating, inserting and maintaining are performed on behalf of a plurality of client devices using the same authentication information, and wherein the authentication information is selected from different sets of authentication information based on at least one of an address of the client device, an address of the server device, a type of data specified in the request, and a protocol used to provide the request.

32. The data communications device of claim 17 wherein the data communications device is a device operating in a network to which hypertext transport protocol traffic is redirected to perform the steps of detecting, creating, inserting and maintaining.

33. A computer program product having a computer-readable medium including computer program logic encoded thereon that, when performed on a computer system having a coupling of a memory, a processor, and at least one communications interface, provides a method for authenticating a client device to a server device by performing the operations of:
detecting a requirement for authentication of a request for data sent from a client device to a server device;
creating, on the processor, an authentication response in memory in response to the step of detecting the requirement for authentication, the authentication response containing authentication information required by the server device to allow the client device to access data via the server device;
inserting the authentication response into the data communications session between the client device and the server device on the at least one communications interface, the authentication response authenticating, to the server device, access to the data by the client device; and
maintaining the data communications session between the server device and the client device in the presence of authentication response information inserted into the data communications session between the client device and the server device by:
maintaining connection state data in the data communications device that tracks an amount of extra data associated with the authentication response that is inserted into the data communications session between the client device and the server device; and
modifying connection information within packets passing through the data communications device that are exchanged between the client device and server device using the data communications session in order to allow the client and server device to maintain proper respective first and second connection states for the data communications session regardless of the amount of extra data added in the data communications session due to insertion of the authentication response.

34. A data communications device comprising:

at least one communications interface;

a memory;

a processor; and an interconnection mechanism coupling the at least one communications interface, the memory and the processor;

wherein the memory is encoded with an authentication manager application that when performed on the processor, produces an authentication manager process that causes the data communications device to provide authentication of a client device to a server device by providing a means including:

means for detecting a requirement for authentication of a request for data sent from a client device to a server device;

means for creating an authentication response in response to the step of detecting the requirement for authentication, the authentication response containing authentication information required by the server device to allow the client device to access data via the server device;

means for inserting the authentication response into the data communications session between the client device and the server device on the at least one communications interface, the authentication response authenticating, to the server device, access to the data by the client device;

means for maintaining the data communications session between the server device and the client device in the presence of authentication response information inserted into the data communications session between the client device and the server device by means for maintaining connection state data in the data communications device that tracks an amount of extra data associated with the authentication response that is inserted into the data communications session between the client device and the server device; and means for modifying connection information within packets passing through the data communications device that are exchanged between the client device and server device using the data communications session in order to allow the client and server device to maintain proper respective first and second connection states for the data communications session regardless of the amount of extra data added in the data communications session due to insertion of the authentication response.

* * * * *